March 31, 1970     J. VINCIGUERRA ET AL     3,503,294

SAWING APPARATUS FOR GEOMETRIC SHAPES

Filed Feb. 2, 1968     2 Sheets-Sheet 1

INVENTORS.
JOSEPH VINCIGUERRA
JAMES J. HENIGAN

BY
ATTORNEY

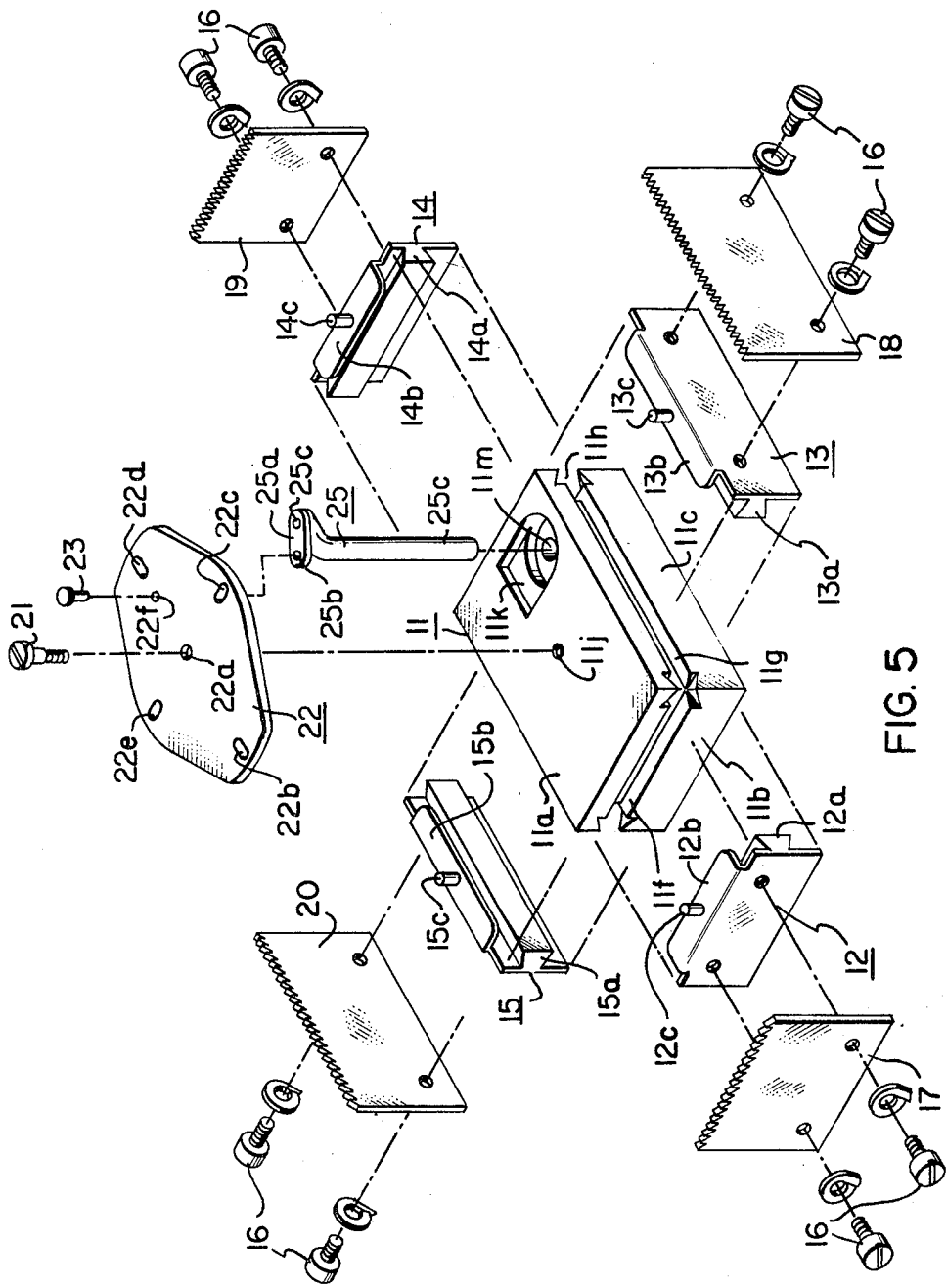

United States Patent Office 3,503,294
Patented Mar. 31, 1970

3,503,294
SAWING APPARATUS FOR GEOMETRIC SHAPES
Joseph Vinciguerra and James J. Henigan, both
c/o 5216 Knox St., Philadelphia, Pa. 19144
Filed Feb. 2, 1968, Ser. No. 702,722
Int. Cl. B26d 5/08
U.S. Cl. 83—618     7 Claims

ABSTRACT OF THE DISCLOSURE

This apparatus includes a central generally rectangular mounting block. Four saw-retaining plates with four rectangular saw blades fixed thereto slide back and forth in channels formed in the sides of the block. Each retaining plate includes a pin which extends beyond the top surface of the block and fits in a slot formed in a rocking driving plate fixed to the top side of the block. This plate rotates alternately clockwise and counter-clockwise in response to the movement of a crank member which eccentrically engages it. The crank member is adapted to be coupled to an appropriate source of rotary power. As a result, the saw blades alternately move clockwise and counter-clockwise around the block, the path of each saw blade overlapping the path of the two saw blades next-adjacent thereto.

Background of the invention

This invention relates to sawing apparatus and in particular to a sawing mechanism which can saw a polygonal or closed-curved portion out of a given body.

Brief summary of the invention

The invention comprises a mechanism having a plurality of blades disposed for simultaneous movement alternately clockwise and counter-clockwise about a central mounting block, the path of each blade overlapping the paths of the blades next adjacent thereto so as to produce a completely cut-out piece of the body to be sawed.

BRIEF DESCRIPTION OF THE DRAWINGS

FIGURE 5 is an exploded perspective view of the apparatus shown in FIGURES 1-4.

Detailed description of the drawings

Figure 3:
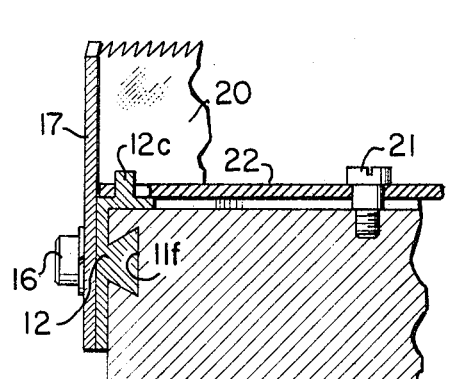
FIGURE 3 is a sectional view of the apparatus shown in FIG. 1 taken along the sectional line 3—3 in the direction indicated.
Figure 2:
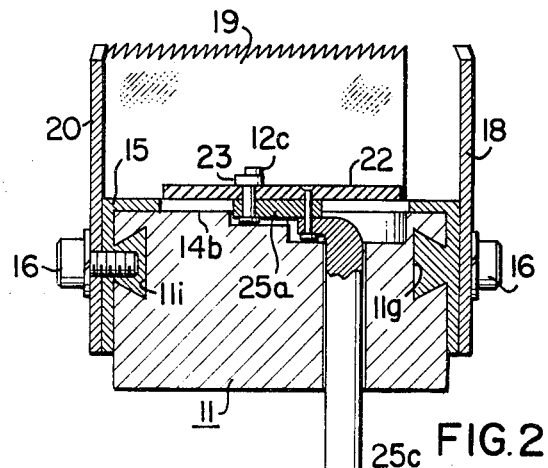
FIGURE 2 is a sectional view taken along the section line 2—2 of FIG. 1 in the direction indicated.

Referring now to the drawings 1—5 there is seen as indicated generally at the numeral 10 a novel sawing apparatus according to the present invention which includes a central mounting block 11 having a top surface 11a. It also includes four sides 11b, 11c, 11d, and 11e in which are formed dovetail channels or mortises 11f, 11g, 11h, and 11i respectively.

Saw retaining plates 12, 13, 14, and 15 are provided which have dovetail splines or tenons 12a, 13a, 14a, and 15a. These splines engage the channels 11f, 11g, 11h, and 11i respectively. The retaining plates also include bent portions 12b, 13b, 14b, and 15b respectively which slide laterally in contact with the top surface 11a. These bent portions include respective pins 12c, 13c, 14c, and 15c fixed perpendicular thereto at the center thereof.

Saw blades 17, 18, 19, and 20 are respectively fixed to the retaining plates 12, 13, 14, and 15 by means of bolts 16 and lock washers. Bolts 16 pass through apertures in the blades and into aligned and threaded apertures in the associated retaining plates.

A driving plate 22 is connected by a bolt 21 to the block 11. The bolt 11 passes through unthreaded aperture 22a and is screwed into a tapped aperture 11j in block 11. The driving plate has arcuate slots 22b, 22c, 22d, and 22e formed therein through which pins 12c, 13c, 14c, and 15c respectively protrude. The driving plate 22 also includes an eccentric unthreaded aperture 22f through which bolt 23 passes which is screwed into threaded aperture 25b of the crank assembly 25.

The assembly 25 includes a flat end portion 25a that is connected by a pivot pin 25c to the bent-over upper terminal portion of the shaft 25c which fits within the recessed portion 11k of the block when the shaft has been passed through the aperture 11m in it. The lower end of the shaft is affixed to an appropriate source of rotary power (not shown).

In operation, the serrated edges of the blades 17, 18, 19 and 20 are placed against the surface of the object in which a geometric shaped portion is to be removed. The free end of shaft 25c is coupled to a power source such as a home power drill and the power is turned on causing the shaft 25c to rotate. As the latter shaft rotates, it will cause the flat portion 25a to rock. Since portion 25a is eccentrically connected to plate 22 the driving plate 22 will also rock with it. This causes the saw blades 17, 18, 19, and 20 to move in unison alternately partially clockwise and then partially counter-clockwise with respect to the axis of the block 11 which passes through aperture 11j because of the engagement of the slots 22b, 22c, 22d, and 22e by the pins 12c, 13c, 14c, and 15c respectively.

Figure 1:
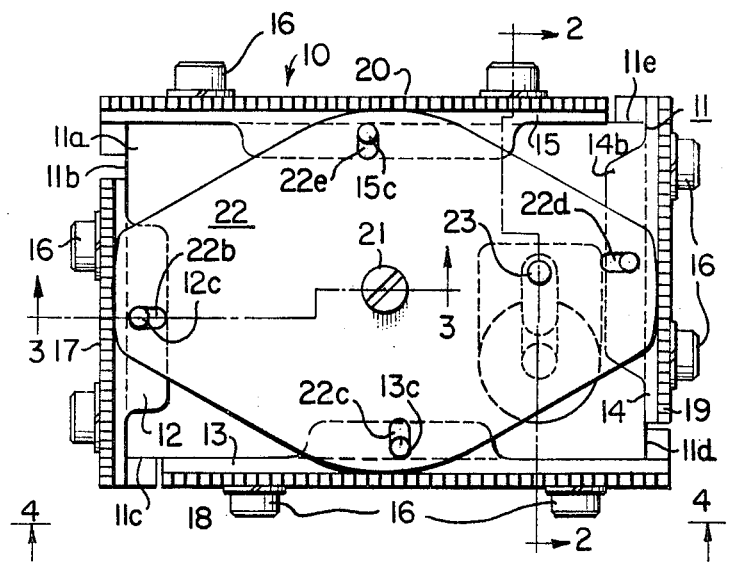
FIGURE 1 is a plan view of the apparatus according to one form of the present invention.
Figure 4:
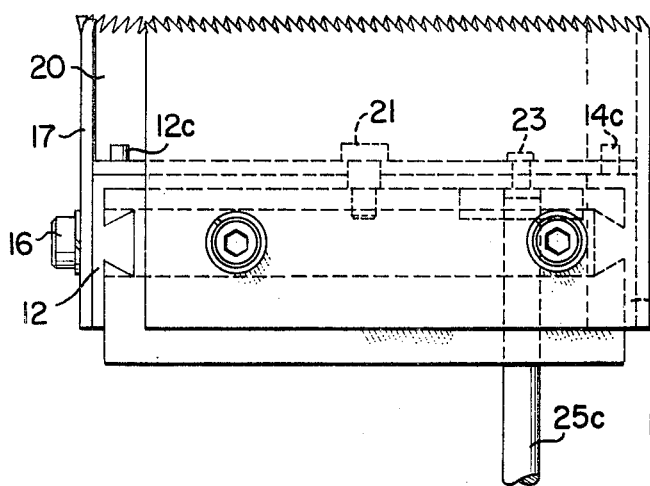
FIGURE 4 is a side elevation view of the apparatus shown in FIG. 1 as viewed in the direction indicated by the line 4—4.

It should be noted that each of the saw blades is permitted to move during each stroke into part of the path of the next adjacent blade which has just moved therefrom and is simultaneously moving into the path of the saw blade adjacent to it. Thus, for example, as blade 17 moves upward (as seen in FIG. 1) upon clockwise rotation of driving plate 22, the upper end of its serrated edge will move to where the left end of the serrated edge of blade 20 is shown in FIG. 1. Simultaneously, of course, the blade 20 is moving to the right until its right end has moved to where the top end of the serrated edge of the blade 19 is shown in FIG. 1, and so forth all around the block 11. Were it not for this overlapping path feature, it would be necessary to manually saw, cut or otherwise sever the unsawed portion between the end of the path of one blade and the beginning of the path of the blade adjacent to it.

GENERAL REMARKS

As shown, the novel sawing device produces a rectangular cut-out from the surface to be sawed. However, it is evident that the cut-out could be square, triangular, or any other shape such as pentagonal, hexagonal, septagonal, etc. As a matter of fact, even a circle, ellipse or other closed curve shape can be produced.

Furthermore, the sides of the cut-out portion need not be perpendicular to the top and bottom surfaces thereof. It may be seen that if the sides 11b, 11c, 11d, and 11e, were to be angled inward from the bottom of the block 11 to the top surface 11a, the cut-out portion would also have correspondingly angled sides.

Another possible construction of the device might include, instead of the slotted driving plate 22, and the pins 12c–15c, a star plate having points which engage slots in the vertical portions of the retainer plates 12, 13, 14, and 15. Also, the spline of each retainer plate need not be dovetail-shaped but could be any other appropriate shape provided the channels 11f, 11g, 11h, and 11i had corresponding cross sections.
present invention should be limited solely by the claims Still other modifications of the apparatus shown, which do not depart from the essence of the invention, will occur to those skilled in the art upon perusal of the present specification and the drawings. Consequently, the present invention should be limited solely by the claims which follow.

We claim:
1. A sawing mechanism comprising:
  (a) a plurality of saw blades having serrated edges disposed for substantially simultaneous engagement of a surface of an object to be sawed, each of said blades having respective first and second ends, the first end of each blade lying adjacent to the second end of the blade disposed next to it,
  (b) means for simultaneously imparting to said plurality of blades repetitive reciprocal movements whereupon the second end of each blade approaches the first end of the next adjacent blade, and the first end of each blade approaches the second end of the blade next to it in alternating sequence.

2. The sawing mechanism according to claim 1 wherein the path of the ends of each blade partially overlaps the path of the ends of the next adjacent blade.

3. The sawing mechanism according to claim 2 wherein there are four blades and each blade is substantially rectangular and the blades are disposed in a generally rectangular formation thereby to produce a rectangular sawed-out portion.

4. The sawing mechanism according to claim 1 wherein said (b) means includes:
  (i) a mounting block,
  (ii) blade retaining means disposed in sliding engagement with the respective sides of said block,
  (iii) a driving plate disposed for rotation on one face of said block, said plate including means for engaging said retaining means to impart motion thereto, and
  (iv) means engaging said driving plate and adapted to be connected to a source of rotary power for causing alternate clockwise and counter-clockwise rotation thereof.

5. The sawing mechanism according to claim 4 wherein said mounting block includes a plurality of channels formed in the sides thereof, wherein said retaining means include a plurality of splines which respectively engage said channels, wherein said retaining means also have a respective plurality of pins projecting therefrom, wherein the means in said driving plate for engaging said retaining means includes a plurality of arcuate slots in which respective ones of said pins are disposed and wherein said (iv) means includes a crank extending through said block and being pivotally and eccentrically mounted to said driving plate.

6. The mechanism according to claim 5 wherein each of said retaining means includes a bent-over portion from which one of said pins project centrally thereof and wherein said crank includes a main shaft portion which passes through an aperture in said block, a bent terminal portion and a flat linkage member pivotally connected at one point to said driving plate and at another point to said bent terminal portion.

7. The sawing mechanism according to claim 2 wherein said blades are arranged to produce a quadrilateral sawed-out portion of the object.

References Cited

UNITED STATES PATENTS

| | | | |
|---|---|---|---|
| 517,906 | 4/1894 | Weldon | 144—78 X |
| 1,281,004 | 10/1918 | Herman. | |

FOREIGN PATENTS 332,774  2/1921  Germany.

JAMES M. MEISTER, Primary Examiner

U.S. Cl. X.R.

30—166; 83—647; 125—18, 20; 144—68; 145—122